(12) United States Patent
Lin et al.

(10) Patent No.: US 10,799,815 B2
(45) Date of Patent: Oct. 13, 2020

(54) HIGH PRESSURE RESISTANT FILTER

(71) Applicant: Saint-Gobain Performance Plastics Corporation, Solon, OH (US)

(72) Inventors: ZhenWu Lin, Pasadena, CA (US); Jacob Andrews, Washington, DC (US)

(73) Assignee: SAINT_GOBAIN PERFORMANCE PLASTICS CORPORATION, Solon, OH (US)

( * ) Notice: Subject to any disclaimer, the term of this patent is extended or adjusted under 35 U.S.C. 154(b) by 133 days.

(21) Appl. No.: 15/174,514

(22) Filed: Jun. 6, 2016

(65) Prior Publication Data

US 2016/0354712 A1    Dec. 8, 2016

Related U.S. Application Data

(60) Provisional application No. 62/172,789, filed on Jun. 8, 2015.

(51) Int. Cl.
*B01D 29/21* (2006.01)

(52) U.S. Cl.
CPC ...... *B01D 29/21* (2013.01); *B01D 2201/0415* (2013.01); *B01D 2201/127* (2013.01)

(58) Field of Classification Search
None
See application file for complete search history.

(56) References Cited

U.S. PATENT DOCUMENTS

| 2,965,933 | A | * | 12/1960 | Kasten | B01D 29/111 264/257 |
| 3,246,765 | A | * | 4/1966 | Colpo | B01D 29/111 210/349 |
| 5,702,603 | A | * | 12/1997 | Johnson | B01D 29/213 156/218 |
| 5,814,219 | A | * | 9/1998 | Friedmann | B01D 29/111 210/493.3 |

(Continued)

FOREIGN PATENT DOCUMENTS

JP         63-59305 A      3/1988
WO    WO 01/93980 A1   12/2001

(Continued)

*Primary Examiner* — Benjamin M Kurtz
(74) *Attorney, Agent, or Firm* — Lorusso & Associates

(57) ABSTRACT

A filter cartridge constructed to prevent an enclosed pleated filter from collapsing into the through-bores formed in a rigid core in high differential pressure applications. The core is modified with reduced-dimension bores to reduce the area of filter material not supported by the core. Alternatively, or in addition, a semi-rigid or rigid core wrap is superposed about the core to add further structural support to the pleated filter. The wrap is formed as a webbed structure with the thickness and spacing of the webbing segments adjusted to partially occlude the underlying core though-bores. This reduces the effective cross-sectional diameter of the through-bores to reduce the overall area of the pleated filter unsupported by the core. The through-bores may have modified shapes to maintain the area of the through-bore and reduce the distance of the through-bore center point from portions of the core wall defining the through-bore. The core also may be modified with clustered through-bores regions.

12 Claims, 7 Drawing Sheets

(56) References Cited

U.S. PATENT DOCUMENTS

| | | | |
|---|---|---|---|
| 6,099,729 A * | 8/2000 | Cella | B01D 29/111 |
| | | | 210/315 |
| 6,524,411 B2 | 2/2003 | Pulek et al. | |
| 8,523,974 B2 | 9/2013 | Mei et al. | |
| 2001/0010297 A1 * | 8/2001 | Pulek | B01D 29/111 |
| | | | 210/493.2 |
| 2004/0031748 A1 | 2/2004 | Kochert et al. | |
| 2004/0195170 A1 | 10/2004 | Hartmann et al. | |
| 2015/0343339 A1 * | 12/2015 | Johnson | B01D 29/15 |
| | | | 210/767 |

FOREIGN PATENT DOCUMENTS

| | | |
|---|---|---|
| WO | WO 03-089104 A2 | 10/2003 |
| WO | WO 03/089104 A2 | 10/2003 |
| WO | WO 2006/107721 A1 | 10/2006 |

\* cited by examiner

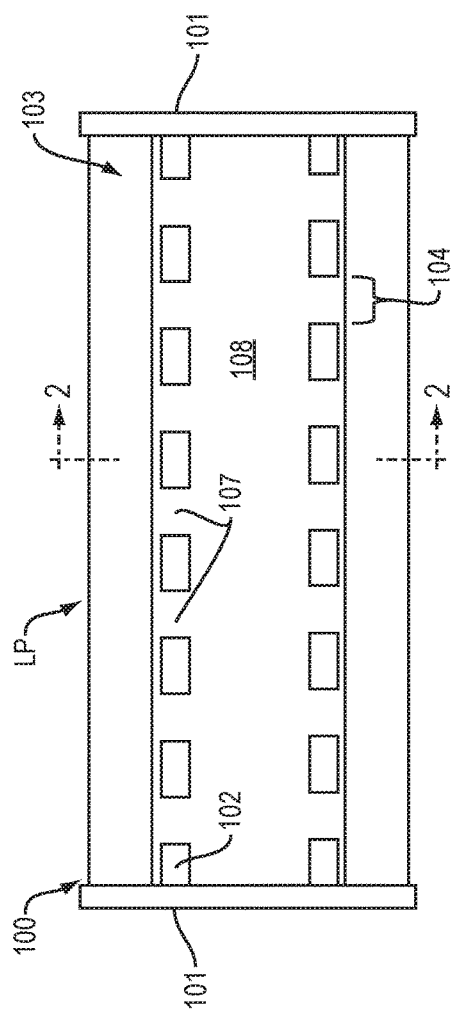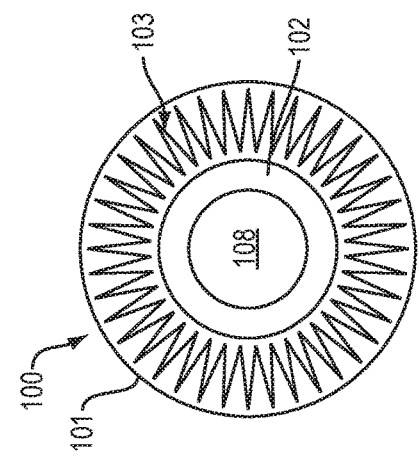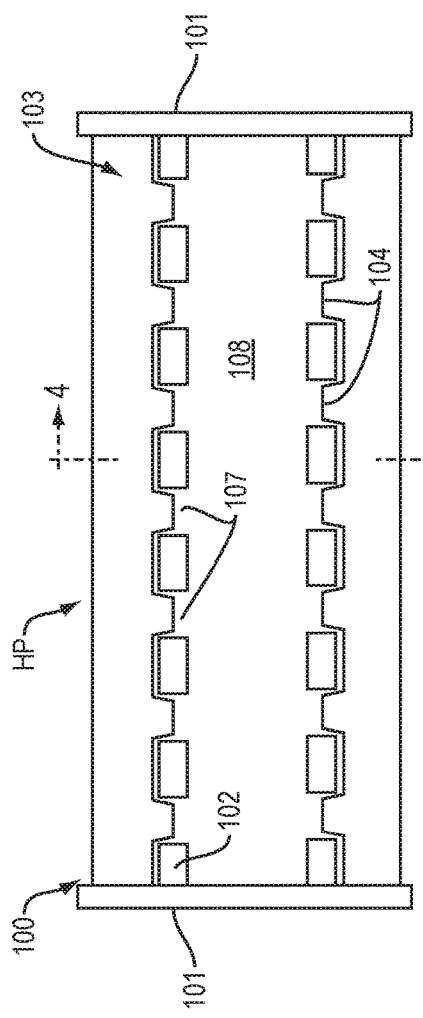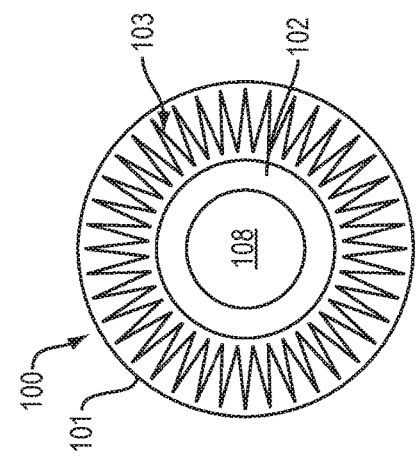

(RELEVANT ART)

HIGH PRESSURE RESISTANT FILTER

CROSS-REFERENCE TO RELATED APPLICATIONS

This disclosure claims the benefit of U.S. Provisional Application Ser. No. 62/172,789, filed Jun. 8, 2015, the contents of which are incorporated herein by reference.

FIELD OF THE DISCLOSURE

The disclosure relates to filter cartridges that exhibit improved resistance to high differential pressure applications. More particularly, the disclosure concerns filter cores and filter core support structures that maintain filter integrity at high differential pressures.

BACKGROUND OF THE DISCLOSURE

Filters are used across a wide range of industries to remove contaminants from fluids. One general filter construction is the pleated filter cartridge as is well known in the art. A pleated cartridge is constructed with filtration media formed with a plurality of alternating folds that extend radially from a core to increase the filter surface area in a defined space along with additional structures that hold the filter media in place. This filter configuration permits connection to, and fluid communication with, the overall filter process, and prevents bypass. The cartridge, when properly assembled into a filtration system, assures that substantially all fluid flowing through the filter system passes through the filter media.

As is well known in the art, currently available filtration cartridges include, to varying degrees, some or all of the following components or structures. Pleat supports are used to secure the filter media into a set pleated pattern. The filtration media is formed from one or more materials such as nylon, polyethylene, polypropylene and treated or untreated cellulosic fibers, among many possible material selection options, and can be constructed as a woven, non-woven, or membrane-type filtration media among many possible media types. End caps are used to secure the edges of the pleated filtration media, maintain pleat alignment and secure the axial orientation of the filter media in the cartridge. Filtration media and any optional support structure(s) are attached to the end caps by thermal or sonic sealing, adhesives and potting, as well as other methods commonly known and used in the art.

Pleated filter cartridges are advantageous in that they significantly increase the available filter surface area in a defined three-dimensional filter housing or cartridge. Although support structures hold the filter media in a desired pleat arrangement and offer some degree of protection and added strength, the supports do not sufficiently prevent filter compression against an internal core when exposed to relatively high levels of pressure. This is particularly true of the areas that function as registration points between the filter pleats and the cartridge core. Due to the pleat configuration, only relatively small portions of the pleated filter media contact the core. This is graphically illustrated in FIGS. 1-4 and 17 that show a relevant art filter cartridge designated generally as 100 with a pleated filter media.

Filter cartridge 100 includes a core 102 with end caps 101 secured to each end of the core. A pleated filter membrane or pleat pack designated generally as 103 is positioned about the core. The core is formed with a series of openings that permit fluids to migrate from the filter media into the core and out the cartridge. As shown particularly in FIGS. 2 and 4, only very small segments of pleat pack 103 register against core 102 creating some unsupported portions of the pleat pack that do not register against the core. The inner pleat pack apexes (also commonly known as valleys) are substantially linear regions of the pleat pack that register against the core and form point loads, or loads along the apexes, parts of which are supported by the solid surface sections of the core and parts of which are unsupported that extend over the core through-bores disclosed below.

As shown in FIG. 1, core 102 has a core wall that defines an outlet chamber 108. A series of through-bores 107 permit processed fluids downstream of pleat pack 103 to flow through the core wall and into the outlet chamber. Standard through-bores have cross-sectional diameters of about 4 mm (millimeters) when circular in shape and about the same measurement when square or rectangular in shape as is common in some cores formed with annular ribs extending around the perimeter of the core and projecting radially outwardly from the core wall. Portions 104 of pleat pack 103 that do not register directly against core 102, but extend across through-bores 107, receive no structural support from the wall of core 102. In low differential pressure applications (designated "LP" in the drawings and herein) (and distinguished from low system pressure), the portions of pleat pack 103 directly supported by the wall of core 102 are adequate to support unsupported portions 104 of pleat pack 103 such that no appreciable deformation or migration of the unsupported portions into through-bores 107 occurs. In contrast, when high differential pressure (designated "HP" herein) (and distinguished from high system pressure), is introduced into a filter assembly in which cartridge 100 is secured, the unsupported pleat sections or areas 104 that extend over the through-bores 107 are forced into the openings and deformed as shown in FIGS. 3 and 4. This deformation, when experienced under certain conditions including high pressure pulsing and sustained high pressure over extended times, can result in membrane failure.

With high differential pressure, certain dynamic events may occur. Although pleat pack 103 may not be torn or structurally compromised, portions 104 extending over through-bores 107 that contact and fold over the core wall portions that define through-bores 107 may become compressed against the bore-defining rims. The remainder of the filter media unsupported over through-bores 107 may stretch and expand into the openings. Some of the pores in the compressed portions may be squeezed shut or significantly distorted and stop functioning as pores. Other pores in the expanded portions may be stretched and distorted so as to have larger cross-sectional areas than their unstressed dimensions. Such distortion events, if they should occur, would defeat the designed purpose and function of the filter media material to have pore sizes controlled within a discrete cross-sectional diameter range and cross-sectional area range. This could potentially permit undesired particulate matter to traverse the filter material, which should have otherwise functioned as a barrier to stop the migration of the particulate material. Moreover, if the pressure reaches a high enough level, the filter media can burst into the through-bores and cause catastrophic failure of the filter media.

For filter designs that do not have a rigid core, a downstream side of the pleated filter media functions as an unsupported core. With low differential pressure applications, the core-less design does not impact the effectiveness of the pleat pack. With the introduction of high differential pressure, however, the pleated filter can collapse upon itself and cease to function. What is needed and what is disclosed is a pleated filter core support that prevents the collapse and/or compression of the filter media into the core through-bores to permit use of pleated filters in high differential pressure applications. What is also disclosed is a core with openings dimensioned and clustered to prevent filter media collapse into the openings under high differential pressure conditions. These and other aspects of the disclosure are described and shown in the following Summary of the Disclosure, Detailed Description of the Disclosure and in the drawings.

SUMMARY OF THE DISCLOSURE

In one aspect of the disclosure, filter media is secured about a porous material in the form of a protective core wrap. The core wrap is secured to a substantially rigid core and forms a porous filter support barrier that provides structural support to the filter media, particularly the unsupported areas of the filter media, and resists filter media migration into the openings or through-bores formed in the core to permit fluids that have passed through the filter media to enter the core and exit the filter assembly. The porous material may be a netting material, a non-woven material, or any other material that may be wrapped around and superposed about the core in order to provide additional support to the filtration media. The material used to construct the protective core wrap may be the same as the pleat support, or may be any material, e.g., Nylon, that provides structural support to the filter media without any substantial fluid flow impedance or restriction.

In another aspect of the disclosure, a filter core is constructed with openings that are reduced significantly in size compared to openings in currently available cartridge cores. By reducing the size of the core openings or through-bores, the span of unsupported membrane over the core opening is significantly reduced. This harnesses the natural rigidity and tensile strength characteristics of the filter media over the small structurally unsupported areas that resist entry into the core wall through-bores. One approach is to limit the dimensions of the through-bores relative to the strength and/or structural characteristics of the material used, including its thickness, so as to withstand relatively high differential pressures on the order of about 30 psi or greater.

In a further aspect of the disclosure, a filter core is constructed with through-bores, slots or other regular or irregular geometrically shaped openings with dimensions smaller than, and/or geometrically different than, openings formed in currently available cartridge cores. The through-bores may be defined dimensionally by spaced ribs formed on the core. The rib widths and spacing can be changed to change the dimensions of the through-bores. In an alternative embodiment, the filter core is formed with openings formed in cluster patterns differentiated from currently available cartridge cores having evenly spaced bore patterns. The modified core may also be wrapped with a porous material to form a permeable, structurally supportive and protective core wrap. The combination of reduced opening size and/or geometric shape (and/or altered opening cluster patterns) in the filter core with the protective core wrap optimizes support to the filter media without significantly diminishing dynamic fluid flow from the filter media to the filter core.

In any of the disclosed embodiments, the ability of the filter cartridge's filter media to resist collapse, breakage, or failure under high differential pressure is significantly increased as compared to currently available cartridge filters. These and other aspects of the disclosure will become apparent from a review of the appended drawings and the detailed description.

BRIEF DESCRIPTION OF THE DRAWINGS

FIG. 1 is a side sectional view of a relevant art filter cage/pleated filter media assembly under low or no pressure conditions.

FIG. 2 is an end sectional view of the relevant art filter cage/pleated filter assembly shown in FIG. 1.

FIG. 3 is a side sectional view of the relevant art filter cage/pleated filter media assembly shown in FIG. 1 under high pressure conditions.

FIG. 4 is an end sectional view of the relevant art filter cage/pleated filter media assembly shown in FIG. 3.

DETAILED DESCRIPTION OF THE DISCLOSURE

Figure 6:
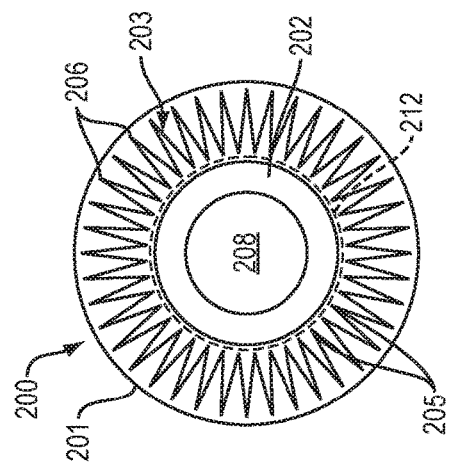
FIG. 6 is an end sectional view of the filter cage/pleated filter media assembly shown in FIG. 5.

Referring to FIGS. 5-8, in one aspect of the disclosure, a filter cartridge shown designated generally as 200 includes end caps 201 secured to ends of a pleated filtration media, or pleat pack designated generally as 203, with a core 202 supporting the pleat pack along an inner diameter. A first set of pleat fold apexes 205 that present as lines, substantially parallel with the longitudinal axis of pleat pack 203, collectively define the inner diameter of pleat pack 203 and register against an outer surface of the wall of core 202 (or against radially projecting ribs if the core is so constructed). A second set of pleat fold apexes 206 also present as lines, are substantially parallel with the longitudinal axis of pleat pack 203 and collectively define the outer cross-sectional perimeter of pleat pack 203.

Core 202 functions as a structural support for pleat pack 203 against pressure gradients introduced into the cartridge. Core 202 is substantially cylindrical in shape (although other shapes are possible and within the scope of the disclosure) with a plurality of through-bores 207 that extend through the wall of the core and permit fluid to flow through the cylindrical side wall. The wall of core 202 defines a core outlet 208 from which fluids processed by filter media 203 exit cartridge 200. End caps 201 may be both open (have through-bores), to permit fluid flow in a double open-ended configuration, or one end cap may be blinded, or closed to flow, as is commonly known in the art. Open end caps are in fluid communication with core outlet 208.

Pleat pack 203 may include one or more optional supportive layers or structures (not shown) that protect and maintain the spacing of the folds of the filtration material to permit improved flow into the pleats, as is commonly known in the art. An optional cartridge cage (not shown), may be used in some embodiments. The cage is a rigid support structure into which pleat pack 203 is secured, and provides protection and support for the outer diameter or perimeter surfaces of pleat pack 203, similar to the protection provided by core 202 to the first pleat fold apexes 205 that define the inner diameter. The cage has an open structure that allows the free flow of fluids into cartridge 200.

Portions of filter media or pleat pack 203 are located over through-bores 207, and are thus unsupported by the rigid structure of core 202. These unsupported areas are designated as filter media sections 204. At relatively high differential pressures, illustratively from about 30 psi to about 80 psi with respect to some filter media embodiments, filter media sections 204 may become distorted and expand into through-bores 207. If sufficiently high differential pressure is applied, sections 204 may rupture without the addition of some form of structural support. It should be understood that the parameter of pressure and what should be deemed high pressure is relative and dependent upon the specific material used to construct pleat pack 203. Each material will have its own strength characteristics and resist distortion or rupture from specific high differential pressure environments based on those strength characteristics. The disclosure covers constructions to harness the pressure-resistant characteristics of different filter media with respect to unsupported areas of filter media disposed about a core with through-bores.

In one aspect of the disclosure, to address the problem of pleat pack distortion, a core wrap 212 is secured about core 202. Core wrap 212 is a semi-rigid or rigid net-like structure that has webbing segments spaced to be less than the cross-sectional diameter of through-bores 207. For any given though-bore, at least one segment of webbing at least partially traverses the through-bore to provide structural support for the previously unsupported filter media section 204. Ideally, the location of webbing segment intersections over through-bores 207 provides the needed support without significantly compromising flow dynamics. To achieve this, wrap 212 cannot be positioned on core 202 so as to have the webbing segments fully occlude through-bores 207 and the spacing between the webbing segments and the widths of the webbing segments have to be set to only partially and not fully occlude adjacent through-bores.

The orientation of wrap 212 relative to the locations of through-bores 207 as well as the width and spacing of the webbing segments may be adjusted to provide the least amount of structural support necessary to prevent pleat pack distortion balanced with an acceptable reduction in fluid flow. Moreover, the width, thickness and spacing of the webbing segments can be adjusted to accommodate differently dimensioned through-bores. For applications that require larger segment spacing, i.e., cores with relatively large diameter through-bores, the thickness and the width of the webbing segments can be increased to provide the necessary support. As should be understood, any modification of the width, thickness and/or spacing of the wrap webbing segments can be altered and remain within the scope and spirit of the disclosure.

Core wrap 212 may be constructed from materials used for filtration supports and include nets, screens, woven materials, non-woven materials, wound strings, extruded materials and membranes as well as any other materials well known in the art for use as filtration media supports, netting, non-woven, or other porous materials. Core wrap 212 may be constructed from: 1) polymers such as Polypropylene, Polyethylene, Nylon, Polyether sulfone, Polyvinylidene fluoride and Polytetrafluoroethylene; 2) metals, such as stainless steel; and/or 3) from any other materials well known in the art for use as netting, woven, non-woven or other porous materials.

Figure 8:
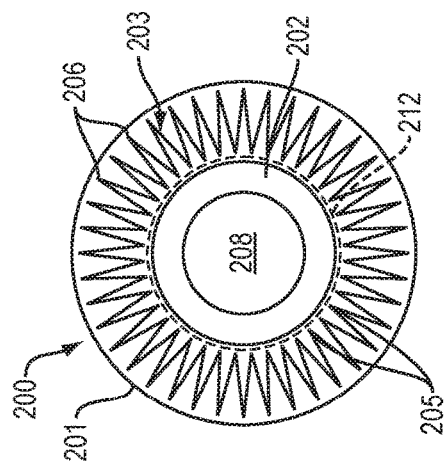
FIG. 8 is and end sectional view of the filter cage/pleated filter media assembly shown in FIG. 7.
Figure 5:
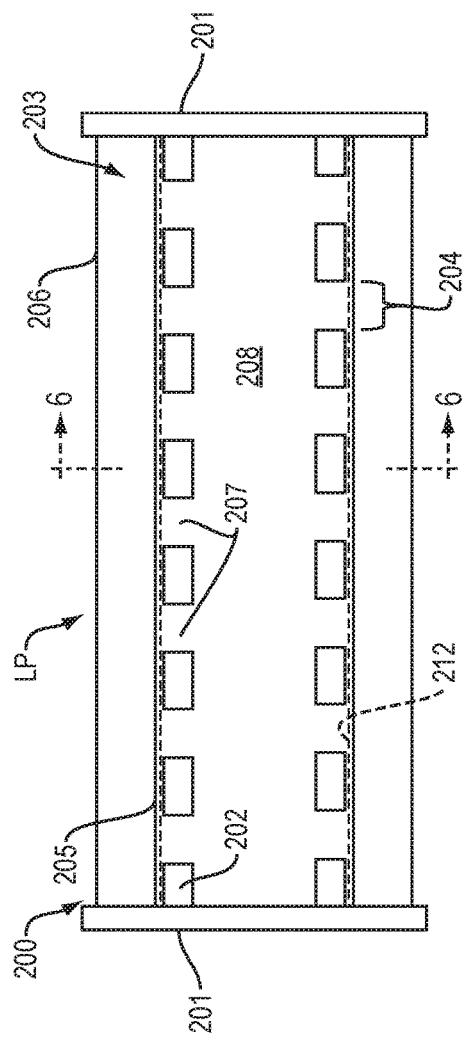
FIG. 5 is a side sectional view of a filter cage/pleated filter media assembly with a core wrap under low or no pressure according to one embodiment of the disclosure.
Figure 7:
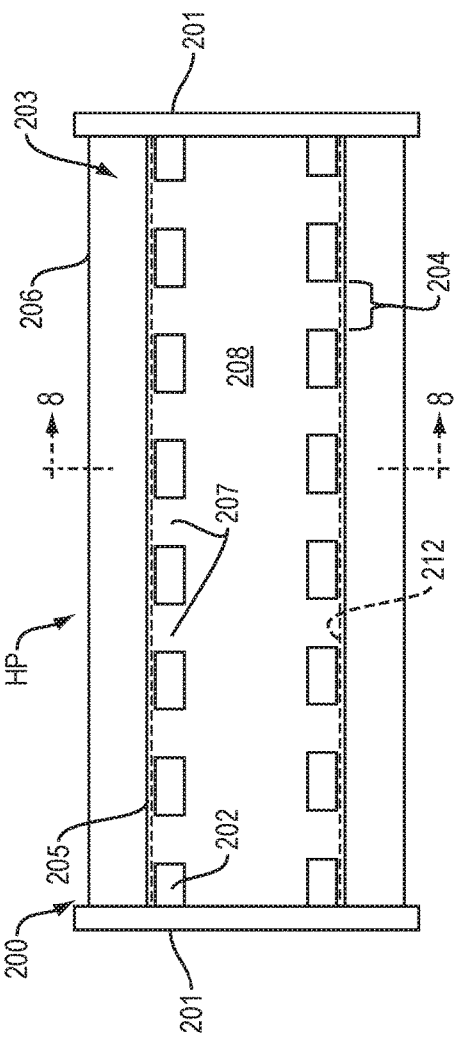
FIG. 7 is a side sectional view of the filter cage/pleated filter media assembly shown in FIG. 5 under high pressure.

Core wrap 212 provides additional support to pleat pack 203 without any functionally significant compromise of dynamic fluid flow by partially spanning the holes in core 202 without fully occluding them. Unlike unsupported filter media segments 104 shown in FIG. 1, unsupported filter media sections 204 do not substantially deform or migrate into through-bores 207 under high differential pressure (from about 30 psi to about 80 psi). Referring again to FIG. 5, the presence of core wrap 212 provides additional support to filtration media sections 204, prevents localized deformation and the possible rupture of unsupported filter media segments 204. The result is a cartridge 200 that is more robust under high differential pressure conditions than conventional cartridge 100. FIGS. 5 and 6 show cartridge 200 under low or moderate differential pressure conditions, i.e., pressures from about 0 psi to about 5 psi. As shown, pleat pack 203 and unsupported filter media sections 204, in particular, do not substantially deform or stretch into through-bores 207 so as to lose functionality. As shown in FIGS. 7 and 8, in high differential pressure conditions, i.e., pressures from about 30 psi to about 80 psi, pleat pack 203 and unsupported filter media sections 204 also do not substantially deform or stretch into through-bores 207. The additional structural support of core wrap 212 prevents this from happening.

Referring now to FIGS. 9-12 and 18, in another aspect of the disclosure, a filter cartridge shown generally as 300 includes features similar to those shown in FIGS. 5-8 for filter cartridge 200, with the exception of a different core 302 and the absence of a core wrap similar to 212. Core 302, though similar to core 202, has through-bores 307 smaller in cross-sectional diameter or length than the through-bores of core 202. The cross-sectional diameters or lengths of through-bores 307 range from about 0.1 mm to about 2 mm and are defined by annular ribs formed around the core extending radially outwardly from the core outer wall surface.

Similar to the function of core wrap 212 shown in FIGS. 5-8, the reduced-diameter through-bores of core 302 result in a cartridge 300 more robust under conditions of high differential pressure than the standard cartridge 100. The smaller diameter through-bores of core 302 perform the same function as wrap 212 in that the span of the bore is reduced to a point at which the strength of the material used to construct the pleat pack (designated generally as 303), is sufficient to withstand high differential pressure environments (from about 30 psi to about 80 psi) without any functionally appreciable filter media distortion or failure. In one embodiment, the dimensions of the through-bores are limited relative to the strength and/or structural characteristics of the material used, including its thickness, so as to withstand relatively high differential pressures on the order of about 30 psi or greater.

Figure 20:
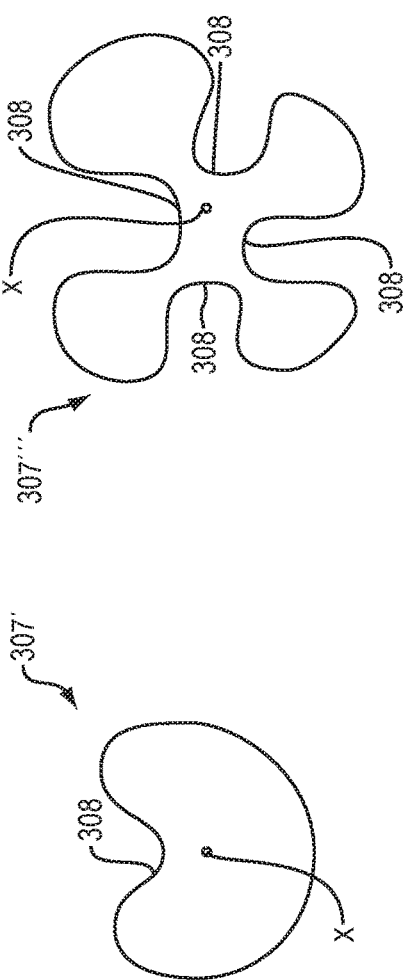
FIG. 20 is a top view of a through-bore with two peninsula sections according to another embodiment of the disclosure.

In alternate embodiments, the general shapes of the through-bores may be altered to reduce the distance an unsupported section of the filter media is from the support structure of the core. In one embodiment shown in FIG. 20, a peninsula 308 is formed extending from the portions of the core wall defining the through-bore 307' into the central area of the through-bore to reduce the radial distance between the through-bore center point X and a section of the perimeter of the through-bore. This ensures any unsupported section of the filter media will be closer to the rigid support structure than unsupported sections over circular through-bores lacking peninsula like structures. As used herein, elements referenced with primed numbers in one embodiment correspond to elements in other embodiments referenced with the same unprimed or differently primed numbers.

Figure 21:
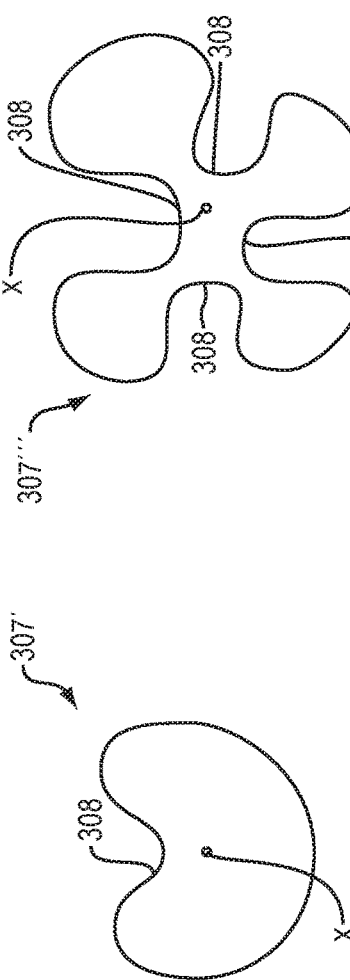
FIG. 21 is a top view of a through-bore with four peninsula sections according to yet another embodiment of the disclosure.
Figure 22:
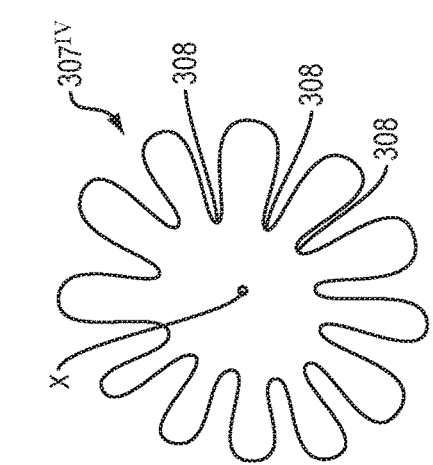
FIG. 22 is a top view of a through-bore with multiple peninsula sections according to a further embodiment of the disclosure.
Figure 19:
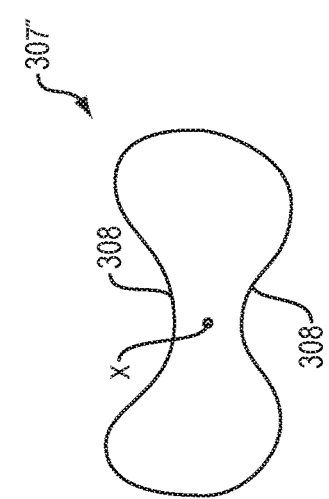
FIG. 19 is a top view of a through-bore with a peninsula section according to one embodiment of the disclosure.

A plurality of peninsula like structures may be included to further reduce the distance any one unsupported section of filter media is from the rigid support structure of the core. FIGS. 19, 21 and 22 show additional alternative through-bore configurations 307'', 307''' and 307$^{IV}$, respectively, that may be used to maintain the same area of a round through-bore of a specific dimension with modified perimeters, but larger overall diameters, to reduce the size of unsupported areas relative to the unsupported area presented by a round through-bore. It should be understood that other regular and irregular geometric shapes may be used to form the through-bores to reduce the radial distance any unsupported section of the filter media is from rigid support structure. Such shapes may also include asymmetrical shapes.

The walls of the through-bores may also be modified. The walls of the through-bores may be oriented perpendicular to a plane tangent to the through-bore location on a cylindrical core. The walls may also be chamfered or radiused on one or both surfaces or sides of the core to present blunted edges to reduce the potential for filter media tearing against the through-bore walls when exposed to relatively high-differential, operational pressures as disclosed herein.

Referring back to the general structure of filter cartridge assembly 300, pleat pack 303 has the same features as pleat pack 203. The ends of pleat pack 303 are secured to end caps 301 that can be open ended or close ended. A series of folds or pleats produce a first set of substantially linear inner apexes 305 and a second set of substantially linear outer apexes 306 that define an inner cross-sectional diameter and an outer cross-sectional perimeter of the pleat pack, respectively. The first set register against core 302 with unsupported segments 304 suspended over through-bores 307.

Figure 10:
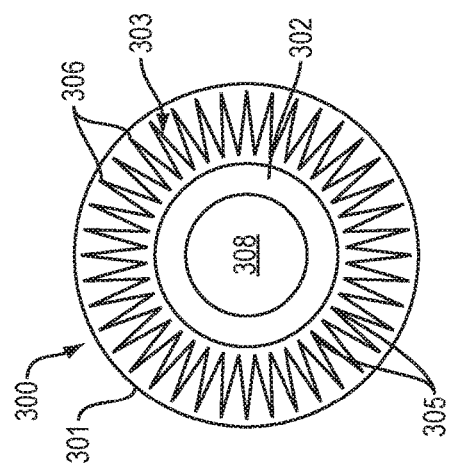
FIG. 10 is an end sectional view of the filter cage/pleated filter media assembly shown in FIG. 9.
Figure 12:
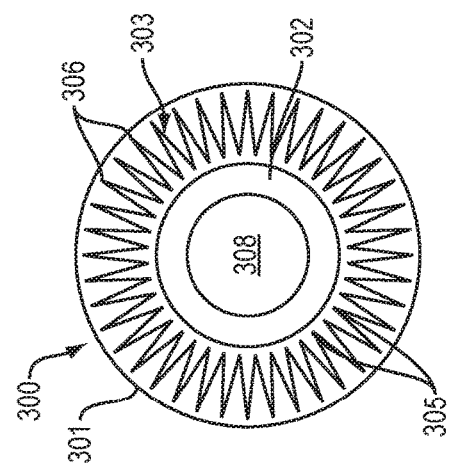
FIG. 12 is an end sectional view of the filter cage/pleated filter media assembly shown in FIG. 11.
Figure 9:
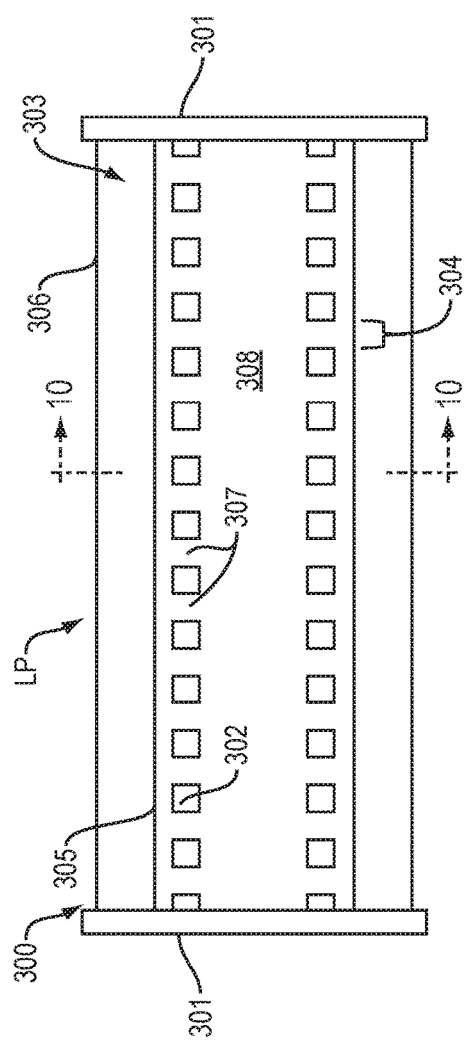
FIG. 9 is a side sectional view of a filter cage/pleated filter media assembly with reduced diameter through-bores under low or no pressure according to another embodiment of the disclosure.
Figure 11:
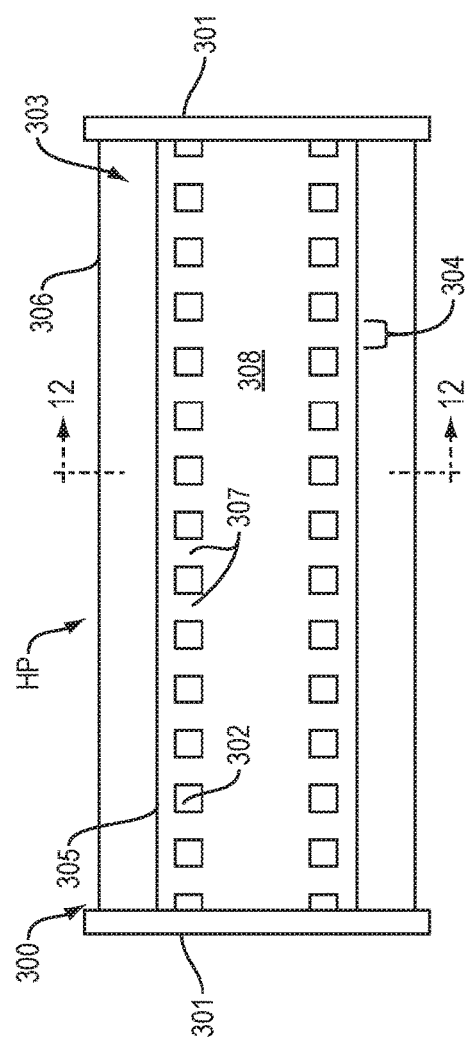
FIG. 11 is a side sectional view of the filter cage/pleated filter media assembly shown in FIG. 9 under high pressure.

As shown in FIGS. 9 and 10, under low or moderate differential pressure conditions, i.e., pressures from about 0 psi to about 5 psi, there is no deformation or collapse of the unsupported sections 304 into through-bores 307. Likewise as shown in FIGS. 11 and 12, under relatively high differential pressure conditions, i.e., pressures from about 30 psi to about 80 psi, the unsupported sections 304 do not deform and collapse into through-bores 307.

Referring now to FIGS. 13-16, in another aspect of the disclosure, a filter cartridge shown generally as 400 includes features similar to those shown in FIG. 5 for cartridge 200, but includes a combination of features shown in FIGS. 5-8 and 9-12 to provide a filter cartridge design with further enhanced pressure-resistance capabilities. Cartridge 400 includes a pleat pack designated generally as 403 secured between end caps 401. As disclosed for other filter cartridge embodiments disclosed herein, end caps 401 can be open-ended, i.e., have at least one through-bore, or be close-ended. If open-ended, the end cap permits fluid communication between the outside of the filter cartridge and the outlet defined by the core disclosed below.

Pleat pack 403 is constructed from any of the materials disclosed herein to construct the other disclosed pleat packs. Pleat pack 403 may also include additional support structures commonly used for pleated filter constructions. The alternating folds or pleats of the filter media will define substantially linear apexes aligned substantially parallel with the longitudinal axis of the pleat pack and form a set of inner apexes 405 and a set of outer apexes 406 as disclosed for filter cartridge 200. The inner apex set 405 will register against a core disclosed below.

Figure 17:
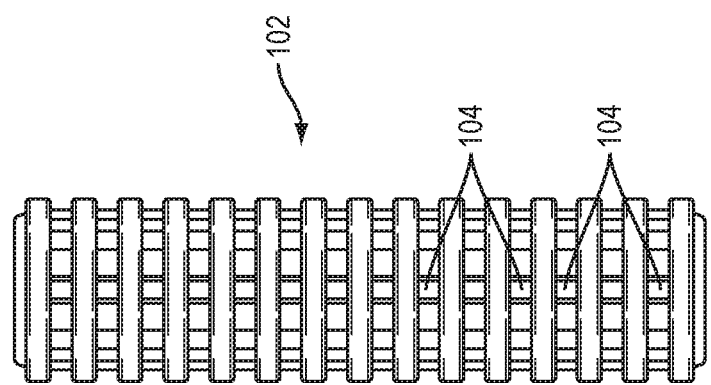
FIG. 17 is a side elevational view of a relevant art filter cage/pleated filter media assembly.

A core 402 extends between end caps 401 and is formed with a series of reduced diameter or reduced length through-bores 407 that range in cross-sectional diameter from about 0.1 mm to about 2 mm. In comparison, the relevant art core shown in FIG. 17 has rectangular through-bores with lengths of about 4 mm. The through-bores can be arranged in any pattern, e.g., rows and columns, helical, diagonal, etc., and can also be arranged in clusters to result in a core with segments free of through-bores. Portions of pleat pack 403 that extend over the through-bores are designated as unsupported sections 404. Core 402 defines a core outlet 408.

A core wrap 412 is disposed about, or superposed about core 402. Like core wrap 212, core wrap 412 is a semi-rigid or rigid net-like structure that has webbing segments spaced to be less than the cross-sectional diameter of through-bores 407. For any given though-bore, at least one segment of webbing at least partially traverses the through-bore to provide structural support for the previously unsupported filter media section 404. Ideally, the location of webbing segment intersections over the reduced diameter through-bores 407 provides the needed support without significantly compromising flow dynamics. Like cartridge filter assembly 200, to achieve this, wrap 412 cannot be positioned on core 402 so as to have the webbing segments fully occlude through-bores 407 and the spacing between the webbing segments and the widths of the webbing segments have to be set to only partially and not fully occlude through-bores adjacent the webbing segments.

The orientation of wrap 412 relative to the locations of through-bores 407 as well as the width and spacing of the webbing segments may be adjusted to provide the least amount of structural support necessary to prevent pleat pack distortion balanced with an acceptable reduction in fluid flow. Because of the reduced diameter condition of the through-bores, it is anticipated that less occlusion will be needed to provide sufficient support to pleat pack 403 to prevent deformation or migration of unsupported sections 404 into through-bores 407 than is needed for filter cartridge assembly 200 constructed with larger diameter through bores. Moreover, in similar fashion to filter cartridge 200, the width, thickness and spacing of the webbing segments of core wrap 407 can be adjusted to accommodate differently dimensioned through-bores. For applications that require larger segment spacing, the thickness and the width of the webbing segments can be increased to provide the necessary support. As should be understood, any modification of the width, thickness and spacing of the wrap webbing segments can be altered and remain within the scope and spirit of the disclosure.

Core wrap 412 may be constructed from the same materials disclosed for core wrap 212. The additional structural support of core wrap 412 coupled with the reduced diameter through-bores improves the overall filter media support and performance when the filter cartridge assembly is exposed to high differential pressure conditions. The combination of features result in a cartridge 400 that is more robust than either the 200 or 300 filter cartridge embodiments under conditions of high differential pressure and far more robust than the standard cartridge 100.

In this combined embodiment, the web spacing in wrap 405 can define the cross-sectional diameters of the through-bores available for fluid flow. This is made possible if the webbing segment spacing is smaller than the cross-sectional diameters of through-bores 407. It should be understood that the same dynamic applies to standard size through-bores with cross-sectional diameters of about 4 mm.

Figure 13:
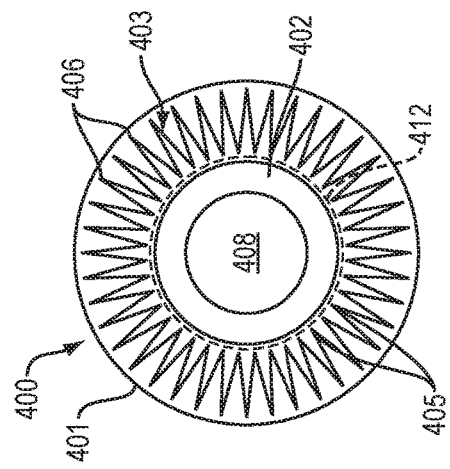
FIG. 13 is a side sectional view of a filter cage/pleated filter media assembly with reduced diameter core through-bores and a core wrap under low or no pressure according to a further embodiment of the disclosure.
Figure 14:
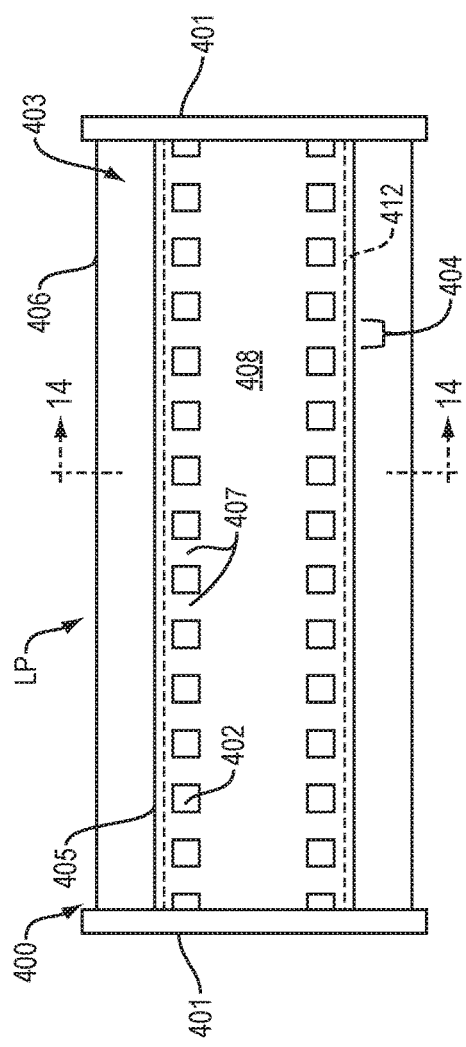
FIG. 14 is an end sectional view of a filter cage/pleated filter media assembly shown in FIG. 13.
Figure 15:
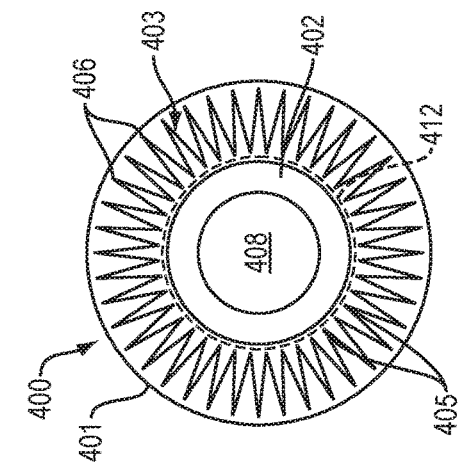
FIG. 15 is a side sectional view of the filter cage/pleated filter media assembly shown in FIG. 13 under high pressure.
Figure 16:
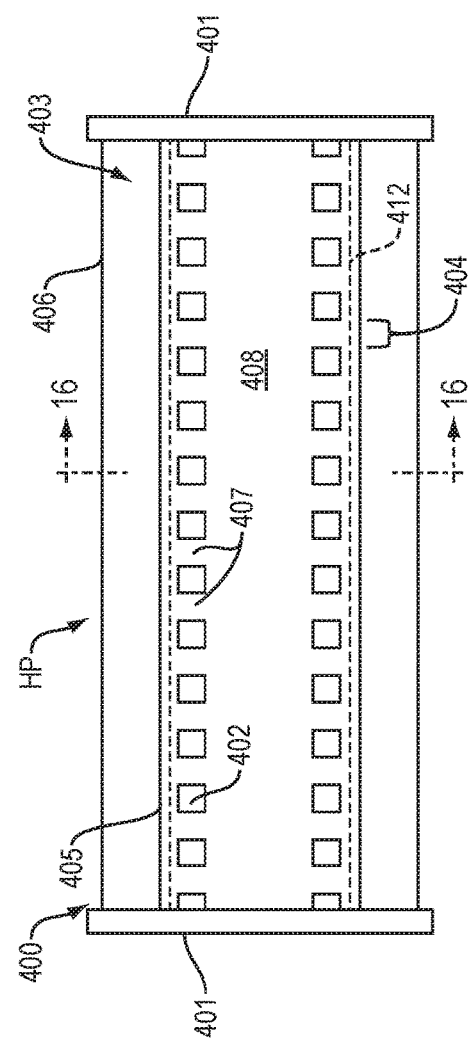
FIG. 16 is an end sectional view of the filter cage/pleated filter media assembly shown in FIG. 15.
Figure 18:
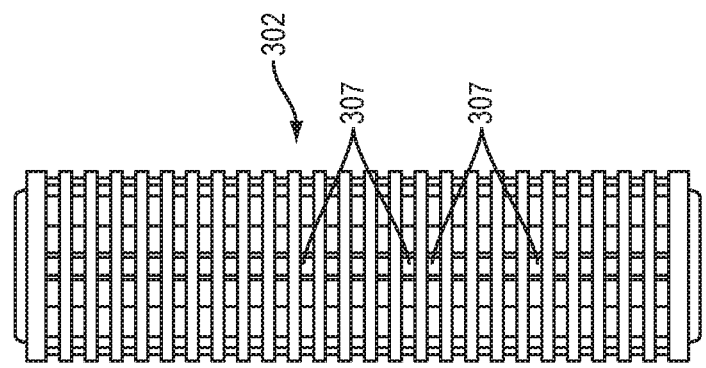
FIG. 18 is a side elevational view of the filter cage/pleated filter media assembly shown in FIGS. 9-12.

FIGS. 13 and 14 show cartridge 400 under low or moderate differential pressure conditions, i.e., pressures from about 0 psi to about 5 psi. As shown, pleat pack 403 and unsupported filter media sections 404, in particular, do not deform or stretch into reduced dimension through-bores 407. As shown in FIGS. 15 and 16, in high differential pressure conditions, i.e., pressures from about 30 psi to about 80 psi, pleat pack 403 and unsupported filter media sections 404 also do not deform or stretch into through-bores 407.

Figure 24:
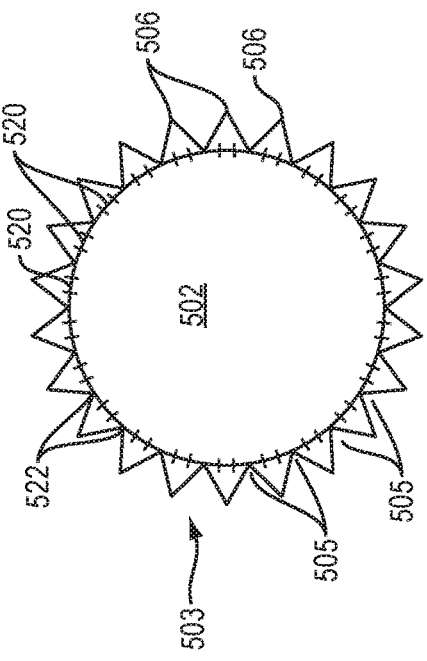
FIG. 24 is a top view of the filter core shown in FIG. 23 with a pleat pack secured about the core.
Figure 23:
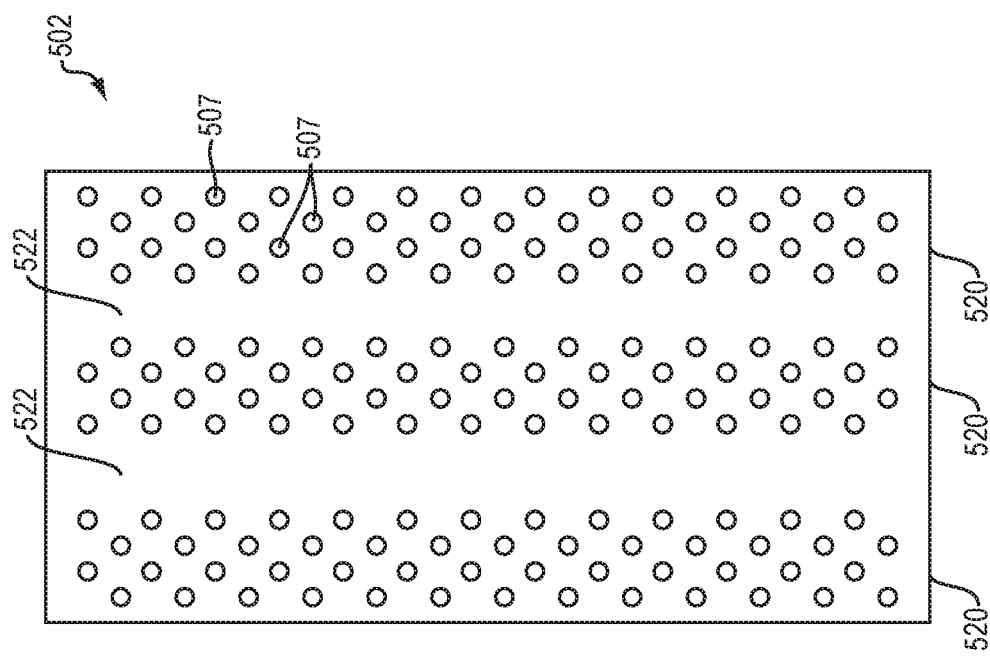
FIG. 23 is a side elevational view of a filter core according to a still further embodiment of the disclosure.

In a yet further aspect of the disclosure, as shown in FIGS. 23 and 24, a core designated generally as 502 is constructed with through-bores formed in cluster patterns differentiated from currently available cartridge cores having evenly spaced bore patterns. As shown, through-bores 507 are clustered into a plurality of columns 520. A second set of through-bore-free columns 522 are arranged in an alternating pattern with columns 520. Columns 522 provide structural support for filter media inner apexes 505 and have a width that can correspond to the thickness of inner apexes 505. The number of columns 522 can also correspond to the number of inner apexes 505. The columns may be oriented parallel with the longitudinal axis of core 502, or may be oriented in different configurations such as spiral, cross-spiral and the like. The number and spacing of the columns can be adjusted for pleat packs 503 with different numbers and thicknesses of inner apexes 505. Outer apexes 506 should lie over columns 520 with these disclosed configurations. In a further embodiment, core 502 and filter end caps (not shown) secured to pleat pack 503 can be constructed with corresponding keyed sections to align through-bore-free columns 522 inner apexes 505.

Although not necessary for this embodiment, a core wrap such as core wrap 212, may be disposed about, or superposed about core 502. The core wrap may be semi-rigid or a rigid net-like structure that has webbing segments spaced to be less than the cross-sectional diameter of through-bores 507. For any given though-bore, at least one segment of webbing at least partially traverses the through-bore to provide structural support to inner apexes 505 should pleat pack 503 shift or translate rotationally relative to core 502 such that columns 522 no longer align with inner apexes 505. Ideally, the location of webbing segment intersections over the through-bores 507 provides the needed support without significantly compromising flow dynamics. Like cartridge filter assembly 200, to achieve this, the wrap cannot be positioned on core 502 so as to have the webbing segments fully occlude through-bores 507 and the spacing between the webbing segments and the widths of the webbing segments have to be set to only partially and not fully occlude through-bores adjacent the webbing segments.

While the present disclosure has been described in connection with several embodiments thereof, it will be apparent to those skilled in the art that many changes and modifications may be made without departing from the true spirit and scope of the disclosure. Accordingly, it is intended by the appended claims to cover all such changes and modifications as come within the true spirit and scope of the disclosure.

What we claim as new and desire to secure by United States Letters Patents is:

1. A filter cartridge assembly comprising:
a filter cartridge cage defining a filter chamber;
a pleated filter assembly secured in the filter chamber having alternating folds including an inner set of folds and an outer set of folds, wherein the pleated filter assembly has a top end and a bottom end, wherein the distance between the two ends defines the axial length of the pleated filter assembly, wherein the filter assembly has a longitudinal axis, and wherein each fold defines a substantially linear apex substantially parallel with the longitudinal axis;
a filter core having a core wall that defines an outlet, wherein the filter core is secured in the filter cartridge surrounded by the pleated filter assembly, wherein the apexes of the inner set of folds register against the core wall, wherein the core wall defines a plurality of through-bores each having a defined diameter, and wherein a subset of the plurality of through-bores are aligned with the apexes of the inner set of folds; and,
a core wrap superposed about the filter core, wherein the wrap comprises spaced webbing segments, wherein the webbing segments register against, and are not adhered to, the pleated filter inner set of folds on one surface and registered against the filter core on an opposite surface, wherein portions of the pleated filter inner set of folds aligned with the subset of the plurality of through-bores are suspended over the subset of through-bores by the spaced webbing segments, wherein the thickness of the webbing segments is less than the defined diameters of the through-bores and the spacing of the webbing segments is less than the defined diameters of the through-bores, and wherein at least some portion of the webbing segments partially occlude the subset of through-bores to reduce the functional defined diameters of the through-bores, and wherein portions of the pleated filter inner set of fold apexes positioned over the subset of the plurality of through-bores and not registered against the webbing segments have direct fluid access or direct fluid communication between the pleated filter inner set of fold apexes and the subset of the plurality of through-bores maintained.

2. The filter cartridge assembly of claim 1 further comprising end caps secured to the ends of the pleated filter assembly, wherein at least one of the end caps is an open-end end cap, wherein the at least one end cap has at least one cap through-bore that permits fluid communication with the outlet.

3. The filter cartridge assembly of claim 1 further comprising end caps secured to the ends of the pleated filter assembly wherein both end caps are open-ended end caps, wherein at least one of the ends caps has at least one through-bore that permits fluid communication with the outlet.

4. The filter cartridge assembly of claim 1 wherein the pleated filter assembly is constructed from filter media selected from the group consisting of polypropylene, polyethylene, nylon, polyether sulfone, polyvinylidene fluoride, polytetrafluoroethylene and combinations thereof.

5. The filter cartridge of claim 1 wherein the cross-sectional diameter or length of the core through-bores is limited to be less than the thickness of the material used to construct the pleated filter assembly.

6. The filter cartridge assembly of claim 1 wherein the perimeters of the plurality of through-bores have a circular border with at least one peninsula extending inwardly from the border toward the through-bore center points, wherein the peninsula has a smooth continuous radiused perimeter including the transition from the through-bore border, and wherein the apexes of the inner set of folds register against the through-bores including at least one peninsula extending inwardly from the through-bore perimeters toward through-bore center points.

7. A filter cartridge assembly comprising:
a filter cartridge cage defining a filter chamber;
a pleated filter assembly secured in the filter chamber having alternating folds including an inner set of folds and an outer set of folds, wherein the pleated filter assembly has a top end and a bottom end, wherein the distance between the two ends defines the axial length of the pleated filter assembly, wherein the filter assembly has a longitudinal axis, and wherein each fold defines a substantially linear apex substantially parallel with the longitudinal axis;
a filter core having a core wall that defines an outlet, wherein the filter core is secured in the filter cartridge surrounded by the pleated filter assembly, wherein the apexes of the inner set of folds register against the core wall, wherein the core wall defines a plurality of circular through-bores each having defined diameters and the same defined areas, wherein at least a subset of the plurality of circular through-bores each have a defined diameter larger than the defined diameters of the through-bores not part of the subset and have a circular border with at least one peninsula extending inwardly from the border toward the through-bore center point to provide structural support near the through-bore center point, wherein the defined open area of each of the through-bores part of the subset is the same as the defined areas of the through-bores not part of the subset, wherein the peninsula has a smooth continuous radiused perimeter including the transition from the through-bore border, and wherein the apexes of the inner set of folds register against the subset of through-bores.

8. The filter cartridge assembly of claim 7 further comprising a core wrap superposed about the filter core, wherein the wrap comprises spaced webbing segments, wherein the thickness of the webbing segments is less than the defined diameters of the plurality of through-bores, wherein the spacing of the webbing segments is less than the defined diameters of the plurality of through-bores, and wherein at least some portions of the webbing segments partially occlude the subset of through-bores against which the apexes of the inner folds register to reduce the functional diameter of the subset of through-bores, and wherein portions of the pleated filter inner set of fold apexes positioned over the subset of the plurality of through-bores and not registered against the web segments have direct fluid access or direct fluid communication between the pleated filter inner set of fold apexes and the subset of the plurality of through-bores maintained.

9. The filter cartridge assembly of claim 8 wherein the core wrap is constructed from materials selected from the group consisting of nets, screens, woven materials, nonwoven materials, wound strings, extruded materials, membranes and combinations thereof.

10. The filter cartridge assembly of claim 7 further comprising end caps secured to the ends of the pleated filter assembly, wherein at least one of the end caps is an open-end end cap, wherein the at least one end cap has at least one cap through-bore that permits fluid communication with the outlet.

11. The filter cartridge assembly of claim 7 wherein the filter core further comprises a plurality of spaced ribs formed on the filter core, each of the plurality of ribs having a defined width, wherein the spacing of the ribs defines the dimensions of the plurality of through-bores.

12. The filter cartridge assembly of claim 7 wherein the pleated filter assembly is constructed from filter media selected from the group consisting of polypropylene, polyethylene, nylon, polyether sulfone, polyvinylidene fluoride, polytetrafluoroethylene and combinations thereof.

* * * * *